United States Patent Office 3,846,267
Patented Nov. 5, 1974

3,846,267
METHOD FOR CROSS-LINKING COPOLYMER OF TETRAFLUOROETHYLENE AND PROPYLENE BY IONIZING RADIATION
Yoneho Tabata and Gen Kojima, Tokyo, Japan, assignors to Japan Atomic Energy Research Institute, Tokyo, Japan
No Drawing. Filed Dec. 27, 1971, Ser. No. 212,660
Claims priority, application Japan, Dec. 30, 1970, 46/122,663, 46/122,664, 46/122,665
Int. Cl. B01j 1/00; C08d 1/00; C08f 1/16
U.S. Cl. 204—159.17           6 Claims

ABSTRACT OF THE DISCLOSURE

A copolymer of tetrafluoroethylene-propylene is irradiated with high energy ionizing radiation in the presence of an allyl group-containing compound, an amine, a basic oxide, a free radical initiator, or a free-oxygen releasable oxidizing agent, as a cross-linking accelerator.

BACKGROUND OF THE INVENTION

Field of the Invention

This invention relates to a method for cross-linking a copolymer of tetrafluoroethylene-propylene by high energy ionizing radiation, and more particularly to a method for cross-linking a copolymer of tetrafluoroethylene-propylene with high energy ionizing radiation in the presence of a specific cross-linking accelerator to improve the cross-linking efficiency.

Description of the Prior Art

Fluorine-containing rubber is now well known in the art and several different varieties are commercially available. The more popular of these types of rubber are the copolymers of vinylidenefluoride-hexafluoropropylene, copolymers of vinylidenefluoride-trifluorochloroethylene and fluorine-containing silicones. Generally, these types of rubbers are desired for their exceptionally high heat resistance.

Copolymers of tetrafluoroethylene and propylene have recently been suggested as another possible fluorine-containing rubber material. For instance, this possibility is disclosed in U.S. Pat. 3,467,635, which suggests cross-linking the copolymer with certain chemical cross-linking agents including the organic peroxy compounds or the amines. Although such conventional cross-linking agents have been shown to have a rather high cross-linking efficiency for such copolymers as that of vinylidenefluoride and hexafluoropropylene, they are rather ineffective for copolymers of tetrafluoroethylene and propylene, and they are particularly ineffective for the binary copolymers of tetrafluoroethylene and propylene. When used for cross-linking these copolymers it has been quite difficult to obtain a high mechanical strength product, even when conventional reinforcing fillers are added thereto.

To alleviate this difficulty, the prior art has suggested the incorporation of an easily cross-linkable unit into the copolymer, thereby forming a terpolymer. While this expedient has been shown to be satisfactory in improving the mechanical strength of the copolymer, it causes a deleterious reduction in the degree of attainable heat resistance.

SUMMARY OF THE INVENTION

Accordingly, it is one object of this invention to provide an improved method for cross-linking a copolymer of tetrafluoroethylene-propylene.

It is another object of this invention to provide an improved method for cross-linking a copolymer of tetrafluoroethylene-propylene with high cross-linking efficiency.

It is still another object of this invention to provide an improved method for producing a cross-linked copolymer of tetrafluoroethylene-propylene having high mechanical strength.

It is a further object of this invention to provide an improved method for cross-linking a binary-copolymer of tetrafluoroethylene-propylene to impart satisfactory mechanical strength.

A still further object of this invention is to provide a process for an improved method for cross-linking a copolymer of tetrafluoroethylene-propylene by high energy ionizing radiation at low dose rates, to provide a high degree of cross-linking.

A further object of this invention is to provide an improved method for cross-linking which can be used for shaped articles composed of copolymers of tetrafluoroethylene-propylene.

These and other objects, as will hereinafter become more readily apparent, have been attained by cross-linking a copolymer of tetrafluoroethylene-propylene using high-energy ionizing radiation in the presence of a specific cross-linking accelerator.

This invention is based on the finding that a copolymer of tetrafluoroethylene-propylene will be cross-linked at a high cross-linking efficiency by irradiation with high energy ionizing radiation. The degree of cross-linking is further improved by carrying out the reaction in the presence of a specific cross-linking accelerator.

DETAILED DESCRIPTION OF THE PREFERRED EMBODIMENTS

According to the methods of this invention, the copolymer of tetrafluoroethylene-propylene is admixed with a specific cross-linking accelerator and the mixture is formed into a suitable shape. The shaped mixture is then irradiated with high energy ionizing radiation.

The copolymers of tetrafluoroethylene-propylene used for the methods of this invention can be prepared in any conventional manner such as by conventional bulk polymerization, solution polymerization, suspension polymerization, emulsion polymerization, or the like.

These copolymers can be produced by using conventional catalyst systems, or polymerization imitators, and can be carried out by thermal polymerization, photopolymerization, high-energy ionizing radiation-polymerization techniques, or the like.

The copolymers used herein may also contain minor amounts of such other copolymerizable components, as ethylene, isobutylene, hexafluoropropylene, chlorotrifluoroethylene, chloroethylvinylether, perfluoroalkylvinylether, or the like.

The molar ratio of tetrafluoroethylene to propylene in the copolymer can be selected over broad ranges, such as tetrafluoroethylene/propylene (molar ratio) of 90/10–20/80, and preferably 70/30–30/70, especially 60/40–40/60. The molecular weight of the copolymer and the molar ratio of the components can be selected according to the properties and applications required of the end product.

As stated above, the methods of this invention can be effectively applied for cross-linking the binary copolymer of tetrafluoroethylene-propylene. It is most preferred to use a copolymer of tetrafluoroethylene-propylene having a molecular weight of greater than 20,000 and an intrinsic viscosity in tetrahydrofuran at 30° C. of greater than 30° C.

According to the present studies, the molecular weight of the starting material copolymer is an important factor in determining the physical properties of the resulting product and particularly the mechanical strength, e.g., tensile strength, of the resulting product. It is preferable to use a copolymer having a molecular weight of 30,000–200,000 and particularly 40,000 to 120,000.

It is possible to easily produce a cross-linked copolymer of tetrafluoroethylene-propylene having a tensile strength of higher than 100 kg./cm.$^2$, and especially higher than 150 kg./cm.$^2$ by the methods of this invention, if the MW is within this range, even if a binary-copolymer of tetrafluoroethylene-propylene is used as the starting material.

When the copolymer is cross-linked using conventional curing agents, such as the organic peroxy compounds, it is quite difficult to impart a tensile strength of more than 60 kg./cm.$^2$, especially with binary-copolymers of tetrafluoroethylene-propylene, even though suitable rubber reinforcing fillers are added, as can be seen from the disclosure of U.S. Pat. No. 3,467,635.

The cross-linking accelerators used for the process of this invention include the allyl group containing organic compounds

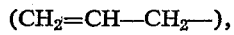
$(CH_2=CH-CH_2-)$, the organic amines, the inorganic basic oxides, the free-radical initiators, or the free oxygen releasable oxidizing agents. For example, suitable *allyl group containing organic compounds* include the mono-allyl compounds, such as allyl amine, allyl ether; the di-allyl compounds, such as di-allyl amine, di-ally ether, di-allyl melamine, di-allyl succinate, di-allyl phthalate, di-allyl maleate; the tri-allyl compounds, such as tri-allyl amine, tri-allyl cyanurate, tri-allyl phosphate, tri-allyl isocyanurate; the *organic amines*, such as alkyl amine, ethylenediamine, tetraethylenepentamine, hexamethylenediamine, triethylenepentamine, hexamethylenetetramine, 2,4,6-tri-amino-1,3,5-triazine, 2-methylimidazole, piperazine anhydride, pyridine; the *organic basic oxides*, such as calcium oxide, zinc oxide, magnesium oxide, lead oxide, tin oxide, including the organic basic hydroxides, such as calcium hydroxide, magnesium hydroxide; the *free-radical initiators*, such as acyl peroxide having the formula:

$RCO-O-O-COR$ such as benzoyl peroxide, or lauroyl peroxide; the peroxy compounds having the formula: $R-O-O-R$ such as di-t-butyl peroxide, dicumyl peroxide; di-peroxy compound, such as 2,5-dimethyl-2,5-di-(t-butyl peroxy)-hexine-3, 2,5-dimethyl-2,5-dimethyl-2,5-di-(t-butyl peroxy)-hexane, $\alpha,\alpha'$-bis-(t-butyl peroxy)-paradiisopropyl benzene, 2,5-dimethyl-2,5-di-(benzoyl peroxy)-hexane; azobisnitrile, such as $\alpha,\alpha'$-azobisisobutyronitrile, 1,1'-azo-bis-1-cyclohexanenitrile; the *free-oxygen-releasable oxidizing agents*, such as the permanaganates, such as potassium permanganate, sodium permanganate, calcium permanganate; perchlorate; dichromate, such as potassium dichromate; sodium dichromate, calcium dichromate, ammonium dichromate.

Mixtures of any of the above may also be suitably used.

Typical cross-linking accelerators used in the methods of this invention include the polyallyl compounds, such as tri-allyl cyanurate, tri-allyl phosphate, tri-allyl isocyanurate, di-allyl maleate, di-allyl phthalate; the organic poly-amines having boiling points of above 50° C. and melting points of below 110° C., such as tetraethylene pentamine, triethylenepentamine, hexamethylenetetramine, piperazine anhydride; the inorganic basic oxides, such as calcium oxide, zinc oxide, magnesium oxide, lead oxide; the organic peroxy compounds, such as benzoyl peroxide, lauroyl peroxide, di-t-butyl peroxide, dicumyl peroxide; the azobisnitriles, such as azobisisobutyronitrile; the alkali metal permanganates, such as potassium permanganate, and alkali metal dichromates, such as potassium dichromate.

The quantity of cross-linking accelerator used will depend upon the particular copolymer and the molecular weight of the copolymer used as a starting material, as well as the mechanical strength and other physical properties desired of the product. It will also depend upon the cross-linking conditions, and the particular accelerator used. If the amount of cross-linking accelerator is too small, however, the extent of acceleration of the cross-linking reaction will also be small.

On the other hand, if the quantity of cross-linking accelerator is too large, no proportionate increase in acceleration effect will be obtained, and the characteristics of the tetrafluoroethylene-propylene copolymer can be adversely affected, and, of course, it also would not be economically practical. Good results are obtainable, when using 0.1–20 parts by weight, and preferably 0.2–10 parts by weight of the cross-linking accelerator per 100 parts by weight of the tetrafluoroethylene-propylene copolymer.

Conventional additives as are frequently used in the conventional cross-linking methods may also be included, such as reinforcing fillers, antioxidants, stabilizers or pigments. However, these aditives cannot be considered as substitutes for cross-linking. The mechanical strength of the resulting cross-linked copolymer can be further improved by use of any of the various well known inorganic reinforcing fillers, such as calcium carbonate, colloidal clay, silica, diatomaceous earth, calcium silicate, or the various types of carbon black.

The tensile strength of the cross-linked copolymer of tetrafluoroethylene-propylene can be increased by the addition of carbon black, colloidal calcium carbonate or amorphous silica. The most preferable inorganic reinforcing fillers include carbon black, amorphous silica, calcium carbonate, and calcium silicate.

The amount of the inorganic reinforcing filler used will depend upon the type of the copolymer and the mechanical strength and other physical properties required of the cross-linked copolymers, and also by the cross-linking conditions. Good results are attainable, however, with 1–100 parts by weight, especially 10–60 parts by weight of inorganic filler per 100 parts by weight of copolymer of tetrafluoroethylene-propylene.

The copolymer is cross-linked with high energy ionizing radiation such as $\alpha$-rays, $\phi$-rays, $\gamma$-rays, X-rays, accelerating particle rays, neutron rays, or an electron beam. Any type of ionizing radiation source can be used, e.g., cobalt-60, cesium-137 or krypton-83, an atomic energy generator, such as an atomic reactor, various types of particle accelators, X-ray generators, electron beam generators, etc. In general, it is preferable to use $\gamma$-rays from a cobalt-60 source, accelerating particle rays or an electron beam.

The dose rate and total dose of the high energy ionizing radiation are not particularly limited; however, when the total dose is too low, it will be difficult to provide sufficient cross-linking and the desirable ultimate tensile strength cannot be obtained. The dose rate should be selected depending upon the time of radiation and other factors. When the dose rate is too high, the physical properties of the resultant cross-linked copolymer will be adversely affected, while when the dose rate is too low, cross-linking will occur too slowly.

Industrially, it is preferable to use a dose rate in the range of $10^2$–$10^9$ roentgens/hour, and preferably $10^3$–$5\times10^7$ roentgens/hour. The total dose should be in the range of about $10^3$–$10^8$ rads. In general, the particular dose and dose rate will depend upon the particular molecular weight of copolymer used.

The cross-linking efficiency can be significantly improved by use of a specific cross-linking accelerator so that it is possible to decrease the total dose of ionizing radiation required. This is quite an important aspect of this invention, since high total doses can result in substantial decreases in the strength and decomposition temperature of the copolymer product.

It has been found that during irradiation with high energy ionizing radiation, main chain scission occurs with the cross-linking reaction. If radiation is used in the cross-linking reaction, low doses will result in a low degree of cross-linking and low ultimate tensile strengths. If the dose rates are increased to increase the extent of cross-linking and to increase the tensile strength, main chain scission can occur and the strength and decomposition temperature of the resulting product can be decreased.

The present invention can provide efficient cross-linking at radiation doses which are less than those which would be expected if no accelerator is present. However, it has further been surprisingly found that without the specific cross-linking accelerator, using small doses of radiation of about 5-6 Mrads, essentially no cross-linking occurs. This fact can be shown by the extent of extractable gelation when the copolymer is irradiated with the accelerator and the extent extractable without the accelerator.

Accordingly, it is quite an advantage to be able to obtain a high degree of cross-linking with only a small total dose of irradiation as provided in this invention. It is possible, according to the methods disclosed herein, to decrease the total dose of ionizing radiation to a range of $10^3 - 3 \times 10^7$ rads, thereby preventing any decrease in ultimate elongation or decrease in decomposition temperature of the resultant cross-linked copolymer.

In accordance with this invention, therefore, whereas the conventional copolymer of tetrafluoroethylene-propylene, and especially the binary copolymer of tetrafluoroethylene-propylene, are ordinarily difficult to cross-link by conventional curing agents, they can be effectively cross-linked by irradiation using relatively small total doses.

It is preferable to admix the copolymer of tetrafluoroethylene-propylene with the cross-linking accelerator, and, if necessary, the reinforcing filler and other additives, prior to subjecting it to irradiation. The copolymer and the additives can be mixed with the use of a suitable roller for kneading rubber, a Banbury mixer, or the like.

The mixing condition is not critical and usually the additives can be completely dispersed into the copolymer by kneading at about 30°-80° C. for about 10-60 minutes.

The method of the present invention can be applied to various forms of tetrafluoroethylene-propylene copolymers containing a cross-linking accelerator, such as shaped articles, particularly films, sheets, pipes, rods, rings, coated membranes, powders or granules. It is preferable, however, to apply the radiation treatment in the absence of any monomers of tetrafluoroethylene, propylene, or other copolymerizable monomer, etc., especially when the copolymer being treated is in the form of a shaped article.

The copolymer can be subjected to the radiation treatment in air; however, it is possible to effect radiation in vacuo or in an inert atmosphere, such as argon, helium or nitrogen. It is also possible to irradiate the copolymer in water. The cross-linking reaction is usually conducted in high efficiency at room temperature. However, it is possible to irradiate at about 100° C., or more.

The following Examples, in which parts and percents are by weight unless otherwise indicated, are intended merely to describe specific embodiments of the present invention and are not intended to be limiting unless otherwise specified.

EXAMPLES 1-3

A copolymer of tetrafluoroethylene-propylene having an average molecular weight of 30,000 (molar ratio of $C_2F_4/C_3H_6$ is 52/48) was admixed with an allyl type compound as shown in Table I, and was uniformly kneaded by a heated roller at 60° C. The resulting mixture was formed into a sheet of 1 mm. in thickness by a hot-press, and was subjected to ionizing radiation at room temperature in air. The radiation was supplied by an electron beam of 1.5 Megavolts output, and 0.48 $\mu$A./cm.$^2$ of electron beam density, generated by a Cockcroft-Walton's electron beam accelerator. The resulting cross-linked copolymer of tetrafluoroethylene-propylene was cut into dumbbell test samples and the mechanical properties were tested. The results are shown in Table I.

In the test of mechanical properties, ultimate tensile strength (kg./cm.$^2$) and ultimate elongation (%) were measured by the tension test of 500 mm./min. of velocity at 25° C., and decomposition temperature (° C.) was measured by thermal differential balance.

The resulting copolymer was extracted with tetrahydrofuran and the rate of the remainder to total copolymer was shown as degree of gelation (%) which indicates the degree of cross-linking. The amount of allyl type compound used is shown in weight percent of copolymer. As a control, the same conditions were applied without the use of any allyl type compound.

TABLE I

| | Accelerator | | Total dose (Mrad) | Cross-linked copolymer | | | Decomp. temp. (° C.) |
|---|---|---|---|---|---|---|---|
| | Type | Amount | | Degree of gelation | Tensile strength | Elongation | |
| Reference | None | | 6 | 0 | 18 | 2,000 | 360 |
| Ex. 1 | Diallyl maleate | 5 | 6 | 50 | 65 | 650 | 340 |
| Ex. 2 | Triallyl cyanurate | 3 | 6 | 42 | 55 | 850 | 340 |
| Ex. 3 | Triallyl phosphate | 2.7 | 6 | 53.7 | 60 | 700 | 340 |

EXAMPLES 4-11

The reaction of Example 1 was repeated with the same copolymer and the same conditions of irradiation, except by using an allyl compound as shown in Table II.

The results of degree of gelation of the resulting cross-linked copolymers are shown in Table II.

TABLE II

| | Allyl type compound | | Degree of gelation of cross-linked copolymer |
|---|---|---|---|
| Example | Type | Amount | |
| 4 | Diallylphthalate | 5 | 19 |
| 5 | Diallylsuccinate | 4.5 | 26.9 |
| 6 | Allyl ether | 5 | 21.5 |
| 7 | Triallyl cyanurate | 7.5 | 31.0 |
| 8 | Diallyl melamine | 5 | 52 |
| 9 | Diallyl ether | 5 | 45 |
| 10 | Diallyl amine | 5 | 15 |
| 11 | Allyl amine | 5 | 34.6 |

EXAMPLES 12-14

A copolymer of tetrafluoroethylene-propylene having an average molecular weight of about 30,000 (molar ratio or $C_2F_4/C_3H_6$ is 52/48) was admixed with a basic oxide as shown in Table III, and was uniformly kneaded by a roller heated at 60° C.

The resulting mixture was formed into a sheet of 1 mm. in thickness by a hot press, and was subjected to ionizing radiation at room temperature in air.

The radiation source was an electron beam of 1.5 Megavolt output, 0.48 $\mu$A./cm.$^2$ electron beam density, provided from a Cockroft-Walton's electron beam accelerator was used for the ionizing radiation.

The resulting cross-linked copolymer of tetrafluoroethylene-propylene was cut into a dumbbell shape and the mechanical properties thereof were tested.

The results are shown in Table III.
The test methods were the same as those of Example 1.

TABLE III

| | Accelerator | | Total dose (Mrad) | Cross-linked copolymer | | |
|---|---|---|---|---|---|---|
| | Type | Amount | | Degree of gelation | Tensile strength | Elongation |
| Reference | None | | 6 | 0 | 18 | 2,000 |
| Ex. 12 | Calcium oxide | 6 | 6 | 42 | 80 | 600 |
| Ex. 13 | Zinc oxide | 3 | 6 | 32 | 60 | 800 |
| Ex. 14 | Magnesium oxide | 1 | 6 | 26 | 50 | 900 |

EXAMPLES 15–24

The reaction of Example 12 was repeated, except substituting the accelerator as stated in Table IV.

The results of degree of gelation of the resulting cross-linked copolymers are shown in Table IV.

TABLE IV

| Example number | Accelerator | | Degree of gelation of crosslinked copolymer |
|---|---|---|---|
| | Type | Amount | |
| 15 | Triethylenepentamine | 3.7 | 29.7 |
| 16 | Hexamethylenetetramine | 3.6 | 28.3 |
| 17 | 2,4,6-triamino-1,3,5-triazine | 4.2 | 15.8 |
| 18 | 2-methylimidazole | 5 | 14.2 |
| 19 | Anhydrous piperidine | 2.2 | 24.1 |
| 20 | Hexamethylene diamine | 0.7 | 8 |
| 21 | Tetraethylenepentamine | 2 | 42 |
| 22 | Pyridine | 5 | 15 |
| 23 | PbO | 5 | 35 |
| 24 | Pb$_3$O$_4$ | 5 | 40 |

EXAMPLES 25–27

A copolymer of tetrafluoroethylene-propylene having an average molecular weight of about 30,000 (molar ratio of $C_2F_4/C_3H_6$ is 52/48) was admixed with a peroxide or oxidizing agent accelerator as shown in Table V, and was uniformly kneaded with a roller heated at 60° C.

The resulting mixture was formed into a sheet of 1 mm. in thickness by a hot press, irradiated at room temperature in air.

The radiation source was an electron beam having 1.5 Megavolt output, 0.49 µA./cm.² of electron beam density, which was provided from Cockroft-Walton's electron beam accelerator was used for the ionizing radiation.

The resulting cross-linked copolymer of tetrafluoroethylene-propylene was cut into dumbbell shapes and the mechanical properties thereof were tested. The results are shown in Table V.

The test methods were the same as those of Example 1.

TABLE V

| | Accelerator | | Total dose (Mrad) | Cross-linking copolymer | | |
|---|---|---|---|---|---|---|
| | Type | Amount | | Degree of gelation | Tensile strength | Elongation |
| Reference | | | 6 | 0 | 18 | 2,000 |
| Ex. 25 | Benzoyl peroxide | 0.2 | 6 | 22 | 65 | 900 |
| Ex. 26 | K$_2$Cr$_2$O$_7$ | 1 | 6 | 42 | 85 | 600 |
| Ex. 27 | Dicumyl peroxide | 5 | 6 | 45 | 95 | 500 |

EXAMPLES 28–29

The reaction of Example 25 was repeated, except substituting the accelerator as stated in Table VI.

The results of the degree of gelation of the resulting cross-linked copolymers are shown in Table VI.

TABLE VI

| Example | Accelerator | | Degree of gelation of cross-linked copolymer |
|---|---|---|---|
| | Type | Amount | |
| 28 | Azobisisobutyronitrile | 5 | 35 |
| 29 | KMnO$_4$ | 5 | 40 |

The same effect was obtained when using other types of free radical initiators or oxidizing agents, and a high degree of gelatin was obtained by applying only small doses of ionizing radiation.

EXAMPLES-30-36

A copolymer of tetrafluoroethylene-propylene having an average molecular weight of about 70,000 (molar ratio of $C_2F_4/C_3H_6$ is 52/48) was admixed with an accelerator as shown in Table VII, and was uniformly kneaded using a roller heated at 60° C. The resulting mixture was formed into a sheet of 1 mm. thickness using a hot-press, and at room temperature in air. (1×10⁶ r./hr. of dose rate and 3 Mrads of total dose using γ-rays from Co-60). The resulting cross-linked copolymer of tetrafluoroethylene-propylene was tested in accordance with Example 1. The results are stated in Table VII.

TABLE VII

| Ex. | Accelerator | | Filler | | Cross-linked copolymer | | | | Decomp. temp. (° C.) |
|---|---|---|---|---|---|---|---|---|---|
| | Type | Amount | Type | Amount | Tensile strength | Elongation | 100% modulus | | |
| 30 | Triallyl cyanurate | 3 | Carbon black FEF | 25 | 180 | 300 | 65 | | 360 |
| 31 | do | 3 | Amorphous silica | 25 | 150 | 350 | 60 | | 350 |
| 32 | do | 3 | Calcium carbonate | 25 | 130 | 340 | 60 | | 350 |
| 33 | Hexamethylene tetramine | 5 | Carbon black FEF | 25 | 140 | 370 | 56 | | 330 |
| 34 | Calcium oxide | 6 | do | 25 | 135 | 420 | 72 | | 365 |
| 35 | Magnesium oxide | 3 | do | 25 | 128 | 520 | 62 | | 350 |
| 36 | BPO | 0.5 | do | 25 | 175 | 320 | 63 | | 345 |

Having now fully described the invention, it will be apparent to one of ordinary skill in the art that many changes and modifications can be made thereto without departing from the spirit or scope of the invention. Accordingly,

What is claimed as new and intended to be secured by Letters Patent is:

1. A method for cross-linking a copolymer of tetrafluoroethylene-propylene which comprises subjecting said copolymer of tetrafluoroethylene-propylene, wherein the ratio of tetrafluoroethylene to propylene in said copolymer is in the range of 90/10 to 20/80 to high energy ionizing radiation in the range of $10^3$–$10^8$ rads in the presence of 0.1 to 20 parts by weight per 100 parts by weight of the copolymer, of a cross-linking accelerator selected from the group consisting of di-allyl amine, di-allyl ether, di-allyl melamine, di-allyl succinate, di-allyl phthalate, di-allyl maleate, tri-allyl amine, tri-allyl cyanurate, tri-allyl phosphate, and tri-allyl isocyanurate.

2. The method according to Claim 1, in which said copolymer is irradiated in the absence of any monomer of tetrafluoroethylene, propylene, or other copolymerizable monomer.

3. The method according to Claim 1, in which said copolymer exposed to irradiation is characterized by an average molecular weight of greater than 20,000 and an intrinsic viscosity in tetrahydrofuran at 30° C. of more than 0.25.

4. The method according to Claim 1, in which said copolymer and said cross-linking accelerator are admixed and are formed into a shaped article prior to irradiation treatment.

5. A method for cross-linking a copolymer of tetrafluoroethylene-propylene wherein the ratio of tetrafluoroethylene to propylene is in the range of 90/10 to 20/80 which comprises admixing said copolymer with 0.1 to 20 parts by weight per 100 parts by weight of the copolymer of a cross-linking accelerator, selected from the group consisting of di-allyl amine, di-allyl ether, di-allyl melamine, di-allyl succinate, di-allyl phthalate, di-allyl maleate, tri-allyl amine, tri-allyl cyanurate, tri-allyl phosphate, tri-allyl isocyanurate, and at least one inorganic reinforcing filler, and irradiating the result mixture with high energy ionizing radiation wherein said filler is present in an amount of from 1 to 100 parts by weight per 100 parts by weight of the copolymer of tetrafluoroethylene-propylene.

6. A method according to Claim 5, in which the mixing operation is carried out at about 30–80° C. for about 10–60 minutes.

References Cited
UNITED STATES PATENTS

| | | | |
|---|---|---|---|
| 3,563,869 | 2/1971 | Rainer et al. | 204—159.2 |
| 3,616,362 | 10/1971 | Soldatos | 204—159.2 |
| 3,627,658 | 12/1971 | Ryffel | 204—159.2 |
| 3,663,662 | 5/1972 | Golike et al. | 204—159.2 |

RICHARD B. TURER, Primary Examiner

U.S. Cl. X.R.

204—159.15, 159.23, 159.24; 260—41 A, 41 C, 41 R, 878